(12) United States Patent
Rohrbacher

(10) Patent No.: US 10,673,640 B2
(45) Date of Patent: Jun. 2, 2020

(54) NETWORK SWITCH

(71) Applicant: Siemens Schweiz AG, Zurich (CH)

(72) Inventor: Kai Rohrbacher, Hünenberg (CH)

(73) Assignee: SIEMENS SCHWEIZ AG, Zurich (CH)

( * ) Notice: Subject to any disclaimer, the term of this patent is extended or adjusted under 35 U.S.C. 154(b) by 126 days.

(21) Appl. No.: 16/042,916

(22) Filed: Jul. 23, 2018

(65) Prior Publication Data

US 2019/0036715 A1    Jan. 31, 2019

(30) Foreign Application Priority Data

Jul. 27, 2017 (EP) .................................. 17183595

(51) Int. Cl.
*H04L 12/10* (2006.01)
*H04B 3/54* (2006.01)
*H04L 12/28* (2006.01)

(52) U.S. Cl.
CPC ............. *H04L 12/10* (2013.01); *H04B 3/544* (2013.01); *H04L 12/2803* (2013.01); *H04B 2203/5462* (2013.01); *H04L 2012/2843* (2013.01)

(58) Field of Classification Search
CPC . H04B 2203/5462; H04B 3/544; H04L 12/10; H04L 12/2803; H04L 2012/284
See application file for complete search history.

(56) References Cited

U.S. PATENT DOCUMENTS

| 2010/0049994 A1* | 2/2010 | Ghoshal .................... G06F 1/26 713/300 |
| 2011/0026525 A1 | 2/2011 | He ................................ 370/392 |
| 2013/0044827 A1 | 2/2013 | Vladan et al. ................ 375/257 |
| 2016/0072602 A1 | 3/2016 | Earl et al. ...................... 709/248 |
| 2017/0041152 A1* | 2/2017 | Sheffield ................ H04B 3/542 |

FOREIGN PATENT DOCUMENTS

| EP | 3128679 A1 | 2/1917 | ............... H04B 3/54 |
| EP | 2485406 A1 | 8/2012 | ............... H04B 3/56 |

* cited by examiner

*Primary Examiner* — Terrell S Johnson
(74) *Attorney, Agent, or Firm* — Slayden Grubert Beard PLLC

(57) ABSTRACT

A network switch with: Power-over-Ethernet ports to connect to twisted-pair wires and transmit signals with a data packet comprising a target address and direct-current electric power via the twisted-pair wires; a first Powerline Communication port to connect to a pair of line wires supplying alternating-current electric power and to transmit signals with a data packet via the pair of line wires; a controller; and a memory storing target addresses by data packet. The controller may: receive a signal from one of the Power-over-Ethernet ports or the Powerline Communication port; demodulate the inbound signal; produce a data packet from the demodulated inbound signal; determine the target address of the data packet; look up the determined target address; produce an outbound signal modulated for the target port; and send the modulated outbound signal to the target port.

15 Claims, 3 Drawing Sheets

NETWORK SWITCH

CROSS-REFERENCE TO RELATED APPLICATIONS

This application claims priority to EP Application No. 17183595.2 filed Jul. 27, 2017, the contents of which are hereby incorporated by reference in their entirety.

TECHNICAL FIELD

The present disclosure relates to networks. Various embodiments may include switches and, in particular, to network switches incorporating routing functionality. For example, some embodiments include a network switch with ports connecting to Power-over-Ethernet networks and with ports incorporating Powerline Communication.

BACKGROUND

During commissioning of structures such as industrial buildings a multitude of appliances need installation and configuration. Typical appliances include, but are not limited to, installations for heating, ventilation, air-conditioning, lights, awnings, and/or control devices therefore. A functional computer network is often not available when such appliances need be configured. A common workaround solution harnesses adapters for Powerline Communication. Network connections for the above appliances are thus established via Powerline Communication.

Systems for Power-over-Ethernet (PoE) combine networking and (direct current) distribution of electric power. Applicable IEEE 802.3ax and other (standards cover distribution of up to 25.5 Watts of power. Higher amounts of power such as 51 Watts, 71 Watts, and/or 90 Watts are envisaged thereby enabling a plethora of potential uses. For these reasons new structures such as newly constructed commercial and/or industrial buildings often provide Power-over-Ethernet systems.

Common CAT-5(e) and/or CAT-6 and/or CAT-7 cables rely on four pairs of twisted copper wires. Various approaches exist for transmission of power over such cables. A first approach known as alternative A harnesses two out of four pairs for power transmission. The same wires are used for power transmission and for network traffic. A second approach relies on separate wires for power transmission and for network traffic. The latter approach is commonly referred to as alternative B. Power-over-Ethernet systems typically rely on ports such as registered jacks for interfacing with a PoE network. An appliance may, by way of non-limiting example, connect to a Power-over-Ethernet network via a type RJ45 registered jack. Rugged types of such jacks are available for harsh environments.

Systems for Powerline Communication (PLC) also combine networking and (alternating current) distribution of electric power. They do so by adding a modulated carrier signal to the ordinary 50 Hz or 60 Hz power signal. The frequency of the carrier signal is typically chosen so as to avoid interference with the ordinary 50 Hz or 60 Hz power signal. Also, the bandwidth of data transmission is chosen to be commensurate with attenuation along power lines and with specified data rates. Systems for Powerline Communication typically rely on ports such as PLC adapters to connect to a PLC network. Powerline Communication adapters plug into electric outlets to connect to a PLC network.

The European patent application EP3128679A1 was filed on 10 May 2016 and was published on 8 Feb. 2017. EP3128679A1 teaches a coupler for Powerline Communication and Power-over-Ethernet. The disclosure of EP3128679A1 allows multiple Power-over-Ethernet nodes coupled to a Powerline Communication bus. EP3128679A1 does not teach a network switch with routing functionality.

The patent application Ser. No. 13/211,187 was filed on 16 Aug. 2011 and was published as US2013/0044827A1 on 21 Feb. 2013. US2013/0044827A1 deals with communications via power line and with a hardware implementation. To that end, US2013/0044827A1 teaches a system 100 with a power supply 110, with a power line 112, and with a load 118. US2013/0044827A1 envisages that power line 112 comprises a network cable such as a CAT-6 Ethernet cable. The system 100 may, in particular, form a portion of a Power-over-Ethernet distribution system.

SUMMARY

The present disclosure improves on technical commissioning aspects of commercial and/or industrial and/or residential structures. The present disclosure describes a network switch incorporating routing functionality for Power-over-Ethernet systems and for Powerline communication. For example, a network switch (1), the network switch (1) may comprise: a plurality of Power-over-Ethernet ports (2, 3), each Power-over-Ethernet port (2, 3) configured to connect to a plurality of twisted-pair wires (6, 7) and configured to send and to receive signals with at least one data packet, the at least one data packet comprising a target address, and configured to transmit direct-current electric power via the plurality of twisted-pair wires (6, 7); at least a first Powerline Communication port (4, 5) configured to connect to a pair of line wires (8, 9) supplying alternating-current electric power and configured to send and to receive signals with at least one data packet via the pair of line wires (8, 9). The at least one data packet comprises a target address. The network switch (1) further comprising a controller (10) and a memory, the memory storing a lookup table with a plurality of entries, wherein each entry comprises a target address of a data packet and a target port selected from one of the ports of the plurality of Power-over-Ethernet ports (2, 3) or from the at least a first Powerline Communication port (4, 5). The controller (10) being communicatively coupled to each of the ports (2-5) of the plurality of Power-over-Ethernet ports (2, 3) and to the at least a first Powerline Communication port (4, 5) and to the memory, the controller (10) being configured to: receive an inbound signal with at least one data packet from one of ports (2-5) of the plurality of Power-over-Ethernet ports (2, 3) or from the at least a first Powerline Communication port (4, 5), demodulate the inbound signal, produce at least one data packet from the demodulated inbound signal, determine the target address of the at least one data packet, look up the determined target address in the lookup table to identify at least one target port (2-5), produce an outbound signal modulated for the at least one target port from the at least one data packet, and send the modulated outbound signal to the at least one target port (2-5).

In some embodiments, the target port (2-5) is configured to send the modulated outbound signal via the plurality of twisted-pair wires (6, 7) if the target port is one of the ports of the plurality of Power-over-Ethernet ports (2, 3), and the target port (2-5) is configured to send the modulated outbound signal via the pair of line wires (8, 9) if the target port is a Powerline Communication port (4, 5).

In some embodiments, the target port (2-5) is configured to receive the signal with at least one data packet via the plurality of twisted-pair wires (6, 7) if the target port is one of the ports of the plurality of Power-over-Ethernet ports (2, 3); and the target port (2-5) is configured to receive the signal with at least one data packet via the pair of line wires (8, 9) if the target port is the at least a first Powerline Communication port (4, 5).

In some embodiments, the controller (10) comprises at least one Power-over-Ethernet modulation unit (11, 12) configured to demodulate an inbound signal for transmission via a plurality of twisted-pair wires (6, 7); and the controller (10) comprises at least one Powerline Communication modulation unit (13, 14) configured to produce an outbound signal modulated for transmission via a pair of line wires (8, 9). The controller (10) may be configured to: use the at least one Power-over-Ethernet modulation unit (11, 12) to produce an outbound signal modulated for the target port (2, 3) from the at least one data packet, if the target port is one of the ports of the plurality of Power-over-Ethernet ports (2, 3), and use the at least one Powerline Communication modulation unit (13, 14) to produce an outbound signal modulated for the target port (4, 5) from the at least one data packet, if the target port is the at least a first Powerline Communication port (4, 5).

In some embodiments, the controller (10) comprises at least one Power-over-Ethernet demodulation unit (11, 12) configured to process a demodulated inbound signal received from one of the ports of the plurality of Power-over-Ethernet ports (2, 3) to produce at least one data packet. The controller (10) comprises at least one Powerline Communication demodulation unit (13, 14) configured to process a demodulated inbound signal received from the at least a first Powerline Communication port (4, 5) to produce at least one data packet, the controller (10) being configured to: use the at least one Power-over-Ethernet demodulation unit (11, 12) to demodulate the inbound signal, if the inbound signal with at least one data packet is received from one of ports (2-5) of the plurality of Power-over-Ethernet ports (2, 3), and use the at least one Powerline Communication demodulation unit (13, 14) to demodulate the inbound signal, if the inbound signal with at least one data packet is received from the at least a first Powerline Communication port (4, 5).

In some embodiments, the controller (10) comprises at least one Power-over-Ethernet demodulation unit (11, 12) configured to demodulate an inbound signal received from one of the ports of the plurality of Power-over-Ethernet ports (2, 3), and the controller (10) comprises at least a one Powerline Communication demodulation unit (13, 14) configured to demodulate an inbound signal received from the at least a first Powerline Communication port (4, 5), the controller (10) being configured to: use the at least one Power-over-Ethernet demodulation unit (11, 12) to produce at least one data packet from the demodulated inbound signal, if the inbound signal with at least one data packet is received from one of ports (2-5) of the plurality of Power-over-Ethernet ports (2, 3), and use the at least one Powerline Communication demodulation unit (13, 14) to produce at least one data packet from the demodulated inbound signal, if the inbound signal with at least one data packet is received from the at least a first Powerline Communication port (4, 5).

In some embodiments, the plurality of Power-over-Ethernet ports (2, 3) comprises: a first Power-over-Ethernet port (2, 3) configured to connect to a first plurality of twisted-pair wires (6, 7) and to transmit direct-current electric power via the first plurality of twisted-pair wires (6, 7); a second Power-over-Ethernet port (2, 3) configured to connect to a second plurality of twisted-pair wires (6, 7) and to transmit direct-current electric power via the second plurality of twisted-pair wires (6, 7); and an interconnecting link electrically connected to the first Power-over-Ethernet port (2, 3) and electrically connected to the second Power-over-Ethernet port (2, 3); wherein the link is configured to transmit direct-current electric power from the first Power-over-Ethernet port (2, 3) to the second Power-over-Ethernet port (2, 3).

In some embodiments, the interconnecting link comprises a bridge wire.

In some embodiments, the interconnecting link comprises a thermistor.

In some embodiments, the first Power-over-Ethernet port (2, 3) comprises a first modular connector configured to connect to the first plurality of twisted-pair wires (6, 7), the first modular connector being of a first type, wherein the second Power-over-Ethernet port (4, 5) comprises a second modular connector configured to connect to the second plurality of twisted-pair wires (8, 9), the second modular connector being of a second type, wherein the first type of modular connector is different from the second type of modular connector.

In some embodiments, the network switch (1) further comprises at least a second Powerline Communication port (4, 5) configured to connect to a second pair of line wires (8, 9) supplying alternating-current electric power and configured to send and to receive signals with at least one data packet, the at least one data packet comprising a target address, via the second pair of line wires (8, 9), the controller (10) being communicatively coupled to the at least a second Powerline Communication port (4, 5), the at least a first Powerline Communication port (4, 5) comprising a first plug of a first type, the at least a first Powerline Communication port (4, 5) comprising a second plug of a second type, wherein the first type of plug is different from the second type of plug.

In some embodiments, the plurality of Power-over-Ethernet ports (2, 3), comprises at least one Power-over-Ethernet port (2, 3) that is compatible with at least one standard selected from:
IEEE 802.3at:2009, or
IEEE 802.3af:2003, or
IEEE 802.3au:2006.

In some embodiments, the network switch (1) additionally comprises a programmable power source (15) configured to supply electric direct-current power, the programmable power source (15) being electrically connected to at least one of the ports of the plurality of Power-over-Ethernet ports (2, 3), the programmable power source (15) being communicatively coupled to the controller (10), the controller (10) being configured to: produce an enable signal, send the enable signal to the power source (15), the power source (15) being configured to: receive the enable signal from the controller (10), and upon receipt of the enable signal, enable supply of direct-current electric power to the at least one Power-over-Ethernet port (2, 3) connected to the power source (15).

In some embodiments, the network switch (1) additionally comprises a programmable power source (15) configured to supply electric direct-current power, the programmable power source (15) being electrically connected to at least one of the ports of the plurality of Power-over-Ethernet ports (2, 3), the programmable power source (15) being communicatively coupled to the controller (10), the controller (10) being configured to: produce a disable signal, send the disable signal to the power source (15), the power source

(15) being configured to: receive the disable signal from the controller (10), and upon receipt of the disable signal, disable supply of direct-current electric power to the at least one Power-over-Ethernet port (2, 3) connected to the power source (15).

In some embodiments, at least one of the ports of the plurality of Power-over-Ethernet ports (2, 3) comprises an electric connector to a twisted-pair wire with a pair of leads; wherein the electric connector to the twisted-pair wire provides comprises a thermistor; and wherein the thermistor is arranged to connect in series with one of the leads of the twisted-pair wire.

BRIEF DESCRIPTION OF THE DRAWINGS

Various features will become apparent to those skilled in the art from the following detailed description of the disclosed non-limiting embodiments. The drawing that accompanies the detailed description can be briefly described as follows.

DETAILED DESCRIPTION

Figure 1:
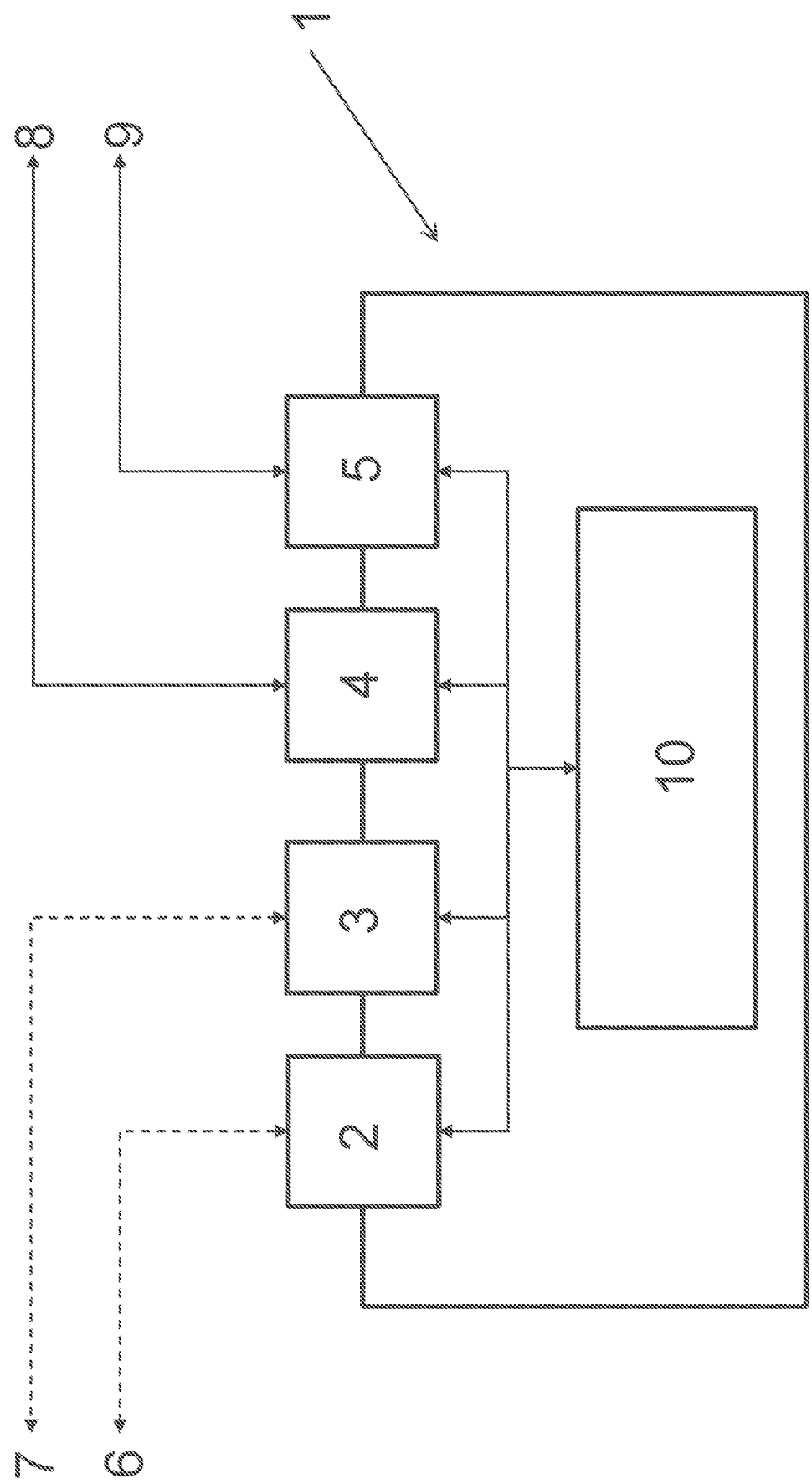
FIG. 1 provides a block diagram of a network switch according to the present disclosure.

The present disclosure describes various network switches with a first plurality of ports. Each of these ports is configured to connect to a Power-over-Ethernet network. In some embodiments, the network switch includes at least a second port and/or a second plurality of ports. The second port is configured to connect to a network using Powerline Communication. In some embodiments, the network switch comprises a processor connected to each of the ports of the first plurality of ports and to the second port or to the second plurality of ports. The network switch also provides routing functionality. That is, the processor is configured to determine target addresses of packets arriving at any of the ports of the device. The processor then determines a target port selected from the first plurality of ports and from the second port or from the second plurality of ports. The processor finally forwards the analyzed packet to the target port.

The network switches as described herein enable communication over Power-over-Ethernet networks in structures with no functional computer network. The network switch may, by way of non-limiting example, connect to a power supply such as a power outlet. The network switch at the same time establishes a computer network via Powerline Communication using the power outlet. The network switch also connects to a (CAT-5 or CAT-6, twisted-pair) cable and establishes a computer network via Power-over-Ethernet. The switching device according to the instant disclosure thus offers benefits in terms of reduced effort during commissioning of structures. The switching device according to the instant disclosure also combines the individual strengths of both PoE and PLC into a new technical principle and thereby avoids the respective weaknesses.

In some embodiments, a network switch includes routing functionality according to the network layer of the seven-layer Open Systems Interconnection (OSI) model of computer networking.

In some embodiments, a network switch includes a plurality of interface modules, wherein the processor connects to each of the ports via an interface module.

In some embodiments, a network switch includes a plurality of modulator/demodulator modules, wherein the processor connects to each of the ports via a modulator/demodulator module. It is, in particular, envisaged that the modules are configured to demodulate signals arriving at the ports and to forward the demodulated signals to the processor. The processor then analyses addresses etc of the packets comprised in the demodulated signals. It is also envisaged that the modules are configured to modulate receive signals with packages from the processor. The modules then forward the modulated signals to the ports connected thereto. The modulator/demodulator modules may be implemented in hardware and/or in software.

In some embodiments, a network switch includes at least a voltage conversion unit. The voltage conversion unit may convert 110 V or 230 V alternating current voltages received from a power outlet to direct current voltages suitable for a Power-over-Ethernet system. The at least a voltage conversion unit may connect to the processor such that it can be enabled or disabled by the processor. The at least a voltage conversion unit may also offer protection against excessive voltages and/or short-circuit currents (in the Power-over-Ethernet system). In an embodiment, the voltage conversion unit comprises a flyback-converter such as a buck (step-down) and/or a boost (step-up) converter.

In some embodiments, ports of the first plurality of ports are compatible with at least one of the standards
IEEE 802.3af:2003 and/or
IEEE 802.3at:2009 and/or
IEEE 802.3au:2006.

In some embodiments, the second port or the ports of the second plurality of ports are configured to work at frequencies selected from at least one of the frequency bands
1.8-30 MHz and/or
1.8-86 MHz and/or
1.8-67.5 MHz.

In some embodiments, the second port or the ports of the second plurality of ports are configured to work at bit rates selected from at least one of
14 Mbit/s and/or
85 Mbit/s and/or
200 Mbit/s and/or
500 Mbit/s and/or
600 Mbit/s and/or
1 Gbit/s and/or
1.3 Gbit/s and/or
1.8 Gbit/s.

In some embodiments, at least one of the ports of the first plurality of ports comprises a type registered jack 45 (RJ45) modular connector. In some embodiments, the ports of the first plurality of ports comprise a first port with a first type of registered jack and a second port with a second type of registered jack, the first type being different from the second type.

In some embodiments, the ports of the second plurality of ports comprise a first PLC port configured to connect to a first type of connector and a second PLC port configured to connect to a second type of connector, the first type of connector being different from the second type of connector. In some embodiments, the first PLC port is configured to connect to a 110 V, 60 Hz, AC connector. The second PLC port is configured to connect to a 230 V and/or 240 V, 50 Hz, AC connector.

FIG. 1 depicts a network switch 1 with different types of ports. The network switch comprises a first plurality of ports 2, 3 for (direct) connection to a Power-over-Ethernet system and/or network. Network switch 1 may, by way of non-limiting example, provide two, five, or ten ports for (direct) connection to a Power-over-Ethernet system and/or network. In some embodiments, at least one of the ports 2, 3 for (direct) connection to a Power-over-Ethernet system and/or network comprises and/or is a type RJ45 registered jack. In some embodiments, all ports 2, 3 for (direct) connection to a Power-over-Ethernet system and/or network comprise and/or are type RJ 45 registered jacks. In some embodiments, network switch 1 comprises ports 2, 3 for (direct) connection to a Power-over-Ethernet system and/or network with at least two different types of connectors and/or jacks. Network switch 1 may, in particular, comprise at least one port 2, 3 for (direct) connection to a Power-over-Ethernet system and/or network with a rugged connector and/or jack. Rugged connectors and/or jacks offer benefits in rough and/or harsh and/or hazardous environments such as construction sites.

In some embodiments, ports 2, 3 are configured to connect to a Power-over-Ethernet system and/or network. FIG. 1 shows connecting lines 6, 7 associated with each port 2, 3. Ports 2, 3 may receive data and/or transmit data and/or receive electric power and/or transmit electric power via their respective connecting lines 6, 7. In an embodiment, at least one PoE port 2, 3 supplies network switch 1 and/or its components with electric power.

Advantageously, at least one PoE port 2, 3 supplies network switch 1 with power from a Power-over-Ethernet system and/or network. Network switch 1 may supply its internal components such as processors, interfaces, status indicators, modulators, demodulators, radio frequency modules, voltage converters, (rechargeable) batteries with (electric) power originating from at least one PoE port 2, 3. The aforementioned list of components is not exhaustive.

In some embodiments, network switch 1 also comprises a port 4 or a plurality of ports 4, 5 for (direct) connection to a system or to a network incorporating Powerline Communication. Network switch 1 may, by way of non-limiting example, provide two, five, or ten ports for (direct) connection to a system and/or to a network incorporating Powerline Communication. In some embodiments, at least one of the ports 4, 5 for (direct) connection to a system and/or to a network incorporating Powerline Communication is compatible with a 110 V, 60 Hz and/or with a 230 V, 50 Hz and/or with a 240 V, 50 Hz electric outlet. In some embodiments, all ports 4, 5 for (direct) connection to a system and/or to a network incorporating Powerline Communication are compatible with 110 V, 60 Hz and/or with 230 V, 50 Hz and/or with 240 V, 50 Hz electric outlets. In some embodiments, network switch 1 comprises ports 4, 5 for (direct) connection to a system and/or to a network incorporating Powerline Communication that are compatible with at least two different types of electric outlets. In some embodiments, network switch 1 may, in particular, comprise at least one port 4 for (direct) connection to a system and/or to a network incorporating Powerline Communication with a rugged connector and/or with a rugged plug and/or with a rugged socket. Rugged connectors and/or rugged plugs and/or rugged sockets offer benefits in harsh and/or rough and/or hazardous environments such as construction sites.

In some embodiments, port 4 or ports 4, 5 is or are configured to connect to a system and/or to a network incorporating Powerline Communication. FIG. 1 shows connecting lines 8, 9 associated with each port 4, 5. Port 4 or ports 4, 5 may receive data and/or transmit data via their respective connecting line 8 or connecting lines 8, 9. In an embodiment, at least one PLC port 4, 5 supplies network switch 1 and/or its components with electric power. Advantageously, at least one PLC port 4, 5 supplies network switch 1 with power from a 110 V, 60 Hz and/or 230 V, 50 Hz and/or 240 V, 50 Hz outlet. Network switch 1 thus supplies its internal components such as processors, interfaces, status indicators, modulators, demodulators, radio frequency modules, voltage converters, (rechargeable) batteries with power originating from at least one PLC port 4, 5. The aforementioned list of components is not exhaustive.

In some embodiments, network switch 1 comprises a power source such as an internal battery that supplies network switch 1 and/or its internal components with electric power. The internal battery may comprise a rechargeable battery. In some embodiments, the power source comprises a fuel cell such as a solid oxide fuel cell and/or a polymer electrolyte fuel cell. Network switches 1 with internal power sources offer advantages at sites with no (functional) mains supply.

In some embodiments, network switch 1 also comprises a controller 10. In some embodiments, controller 10 is a microprocessor and/or a microcomputer. Controller 10 may comprise a (non-volatile) memory and/or a suitable interface therefore. The skilled person chooses a controller 10 with a suitable design such as a processor implementing a complex instruction set or a processor implementing a reduced instruction set.

In some embodiments, controller 10 connects to all of the PoE ports 2, 3 and to the PLC port 4 or to the PLC ports 4, 5 of network switch 1. In some embodiments, controller 10 and/or PoE ports 2, 3 and/or PLC port 4 and/or PLC ports 4, 5 provide suitable interfaces to establish such (direct) connections. The (direct) connections may support bidirectional and/or (full) duplex communication. The skilled person chooses a suitable bus and/or suitable busses for these (direct) connections.

In some embodiments, controller 10 runs an operating system. The operating system may, for instance, be an Android® operating system, a Windows® operating system, or a Linux® operating system such as Meego®. The operating system may be a system specifically tailored to embedded systems and/or to controllers for network switches. The operating system may also be general-purpose.

In some embodiments, controller 10 connects to at least one of the PoE ports 2, 3 or to at least two or to at least three of the PoE ports 2, 3 and/or of the PLC port 4 and/or of the PLC ports 4, 5 of network switch 1. In some embodiments, controller 10 and/or PoE ports 2, 3 and/or PLC port 4 and/or PLC ports 4, 5 provide suitable interfaces to establish such (direct) connections. The (direct) connections ideally support bidirectional and/or (full) duplex communication. The skilled person chooses a suitable bus and/or suitable busses for these (direct) connections.

In some embodiments, network switch 1 incorporates routing functionality. As a signal arrives at one of the ports 2-5, the signal may be demodulated by the respective port 2-5 to produce one or several data packets. The data packets are then forwarded to controller 10. In some embodiments, the signal is forwarded to controller 10. Controller 10 demodulates the signal to produce one or several data packets.

In some embodiments, controller 10 is, in particular, configured to retrieve and/or analyze and/or process and/or inspect target addresses of such data packets. These target addresses may, by way of non-limiting example, be mediaaccess-control addresses (OSI level 2) and/or internet protocol version 4 (OSI level 3) and/or internet protocol version 6 (OSI level 3) addresses. Controller 10 also implements a lookup table such as a switching table and/or a routing table. The lookup table may be stored in a (non-volatile) memory of or associated with controller 10.

In some embodiments, the lookup table provides entries that map addresses or ranges of addresses to ports 2-5 of network switch 1. Controller 10 thus selects the entry of the lookup table that matches the target address of any particular data packet. Controller 10 then chooses a port 2-5 of network switch 1 that is associated with the target address of the data packet and/or with the selected entry of the lookup table. In some embodiments, the lookup table provides entries that associate a single target address with a plurality of ports 2-5. In some embodiments, the lookup table associates a target address with the network switch 1 itself. That is, a data packet may not be forwarded but be processed by the (controller 10) of the network switch 1 itself. Network switch 1 is in this case the destination of that data packet.

In some embodiments, the data packet may afterwards be forwarded to the chosen port 2-5. The chosen port 2-5 then modulates the data packet to produce a signal to be transmitted via its associated connecting line 6-9. In some embodiments, controller 10 modulates the data packet to produce the signal to be transmitted by the chosen port 2-5. The modulated signal is then forwarded to the chosen port 2-5. The modulated signal can now get transmitted by the connecting line 6-9 associated with the chosen port 2-5.

In some embodiments, network switch 1 provides firewall functionality. Controller 10 is, in particular, configured to retrieve and/or analyze and/or process and/or inspect target addresses and other content of such data packets. The target addresses may, by way of non-limiting example, be media-access-control addresses and/or internet protocol version 4 and/or internet protocol version 6 addresses. Controller 10 also implements a set of firewall rules such as iptables rules. The set of firewall rules is preferably stored in a (non-volatile) memory of or associated with controller 10.

In some embodiments, the set of firewall rules maps addresses and/or other content of data packets to specific actions to be taken for such packets. Controller 10 is configured to select a rule from the set of firewall rules that applies to an address and/or to other content of a data packet. The selected rule may define an action such as rejecting data packet, accepting data packet, dropping data packet, and/or logging to (a) log file(s) and/or to (a) database(s). The log file(s) and/or database(s) are advantageously stored in a (non-volatile) memory of or associated with controller 10. The aforementioned list of actions is not exhaustive. The data packet may be processed and/or forwarded and/or modulated as detailed above depending on any taken action.

In some embodiments, network switch 1 permanently supplies all of its Power-over-Ethernet ports 2, 3 with power. The power supplied to the PoE ports 2, 3 may, by way of non-limiting example, originate from one of the power sources described above. Network switch 1 may draw power from one of the ports 2, 3 for (direct) connection to a Power-over-Ethernet network and/or system to thereby supply any other PoE port(s) 2, 3. Network switch 1 may draw power from several of the ports 2, 3 for (direct) connection to a Power-over-Ethernet network and/or system to thereby supply any other PoE port(s) 2, 3.

In some embodiments, network switch 1 permanently supplies a subset of its Power-over-Ethernet ports 2, 3 with (amounts of) power with the subset of ports not comprising all Power-over-Ethernet ports 2, 3. The power supplied to the subset of PoE ports 2, 3 may, by way of non-limiting example, originate from one of the power sources described above. Network switch 1 may draw power from one of the ports 2, 3 for (direct) connection to a Power-over-Ethernet network and/or system to thereby supply the aforementioned subset of PoE port(s) 2, 3. Network switch 1 may draw power from several of the ports 2, 3 for (direct) connection to a Power-over-Ethernet network and/or system to thereby supply the aforementioned subset of PoE port(s) 2, 3.

In some embodiments, network switch 1 provides a bridge that interconnects the twisted-pair wire(s) for power transmission of its PoE ports 2, 3. The bridge may, in particular, comprise a pair of bridge wires for each twisted-pair wire to be interconnected. In some embodiments, at least one pair of bridge wires comprises at least one non-linear resistor such as thermistor, in particular a positive thermal coefficient (PTC) element. The non-linear resistor may be arranged in series with one of these wires. Bridges with non-linear resistors limit short-circuit currents through the Power-over-Ethernet system and/or network.

Figure 2:
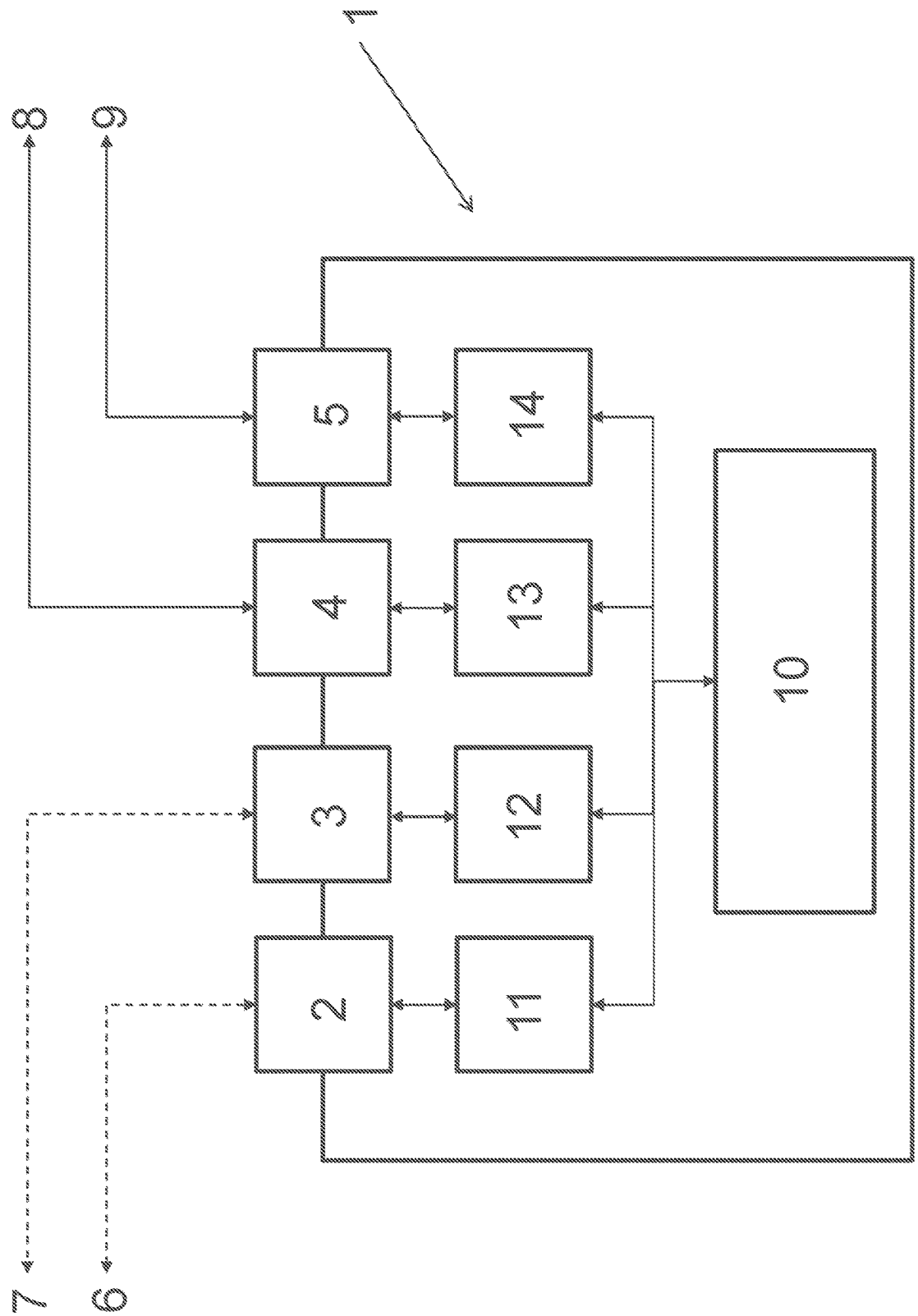
FIG. 2 provides a block diagram of a network switch wherein ports connect to a processor via interface units and/or modulators/demodulators.

A network switch 1 with separate modulator/demodulator 11-14 units is shown on FIG. 2. A modulator/demodulator unit 11-14 is connected to every port 2-5 of network switch 1. Also, every modulator/demodulator unit 11-14 connects to controller 10. Modulator/demodulator units 11-12 may be configured to modulate and/or demodulate signals for transmission over Power-over-Ethernet systems and/or networks. Modulator/demodulator units 13-14 may be configured to modulate and/or demodulate signals for transmission over systems and/or networks incorporating Powerline Communication. In some embodiments, network switch 1 comprises only a single modulator unit 13 for Powerline Communication and only a single port 4 for Powerline Communication.

In some embodiments, modulator/demodulator units 11-14 each comprise (integrated) circuits. A modulator/demodulator unit 11-14 may, in particular, comprise separate circuits for modulation and/or demodulation. In some embodiments, at least one modulator/demodulator unit 11-14 or all modulator/demodulator units 11-14 form(s) (an) integral part(s) of controller 10. In some embodiments, at least one modulator/demodulator unit 11-14 or all modulator/demodulator units 11-14 form(s) (an) integral part(s) of its associated port 2-5.

In some embodiments, controller 10 connects to all of the modulator/demodulator units 11-14 of network switch 1. In some embodiments, controller 10 and modulator/demodulator units 11-14 provide suitable interfaces to establish such (direct) connections. The (direct) connections may support bidirectional and/or (full) duplex communication. The skilled person chooses a suitable bus and/or suitable busses for these (direct) connections.

In some embodiments, each modulator/demodulator unit 11-14 connects to a single port 2-5 of network switch 1. In some embodiments, modulator/demodulator units 11-14 and ports 2-5 provide suitable interfaces to establish such (direct) connections. The (direct) connections may support bidirectional and/or (full) duplex communication. The skilled person chooses a suitable bus and/or suitable busses for these (direct) connections.

As a signal arrives at one of the ports 2-5 shown on FIG. 2, the signal is forwarded to the modulator/demodulator unit 11-14 associated with the port 2-5. Modulator/demodulator unit 11-14 then demodulates the signal and forwards the demodulated signal to controller 10. In some embodiments, modulator/demodulator unit 11-14 demodulates the signal to produce one or several data packets. Modulator/demodulator unit 11-14 forwards data packets to controller 10.

As controller 10 transmits a signal to a port 2-5, the modulator/demodulator unit 11-14 for that port 2-5 receives the signal. Modulator unit 11-14 processes the signal to produce a modulated signal. Modulator/demodulator unit 11-14 then forwards the modulated signal to its associated port 2-5. In an embodiment, controller 10 forwards one data packet or several data packets to a port 2-5. The modulator/demodulator unit 11-14 for that port 2-5 receives the data packet(s). Modulator/demodulator unit 11-14 processes the data packet(s) to produce a modulated signal. Modulator/demodulator unit 11-14 forwards the modulated signal to its associated port 2-5.

In some embodiments, at least one Power-over-Ethernet port 2, 3 implements protection against overcurrents. To that end, a resistive element such as a PTC resistor is arranged in (series with) one of the wires for (direct) connection to a CAT-5 or CAT-6 cable. A comparator such as an operational amplifier or a (field-effect) transistor monitors the voltage drop over the resistive element. If the current through the resistive element exceeds a pre-determined threshold, the voltage drop over the resistive element will also exceed a pre-determined voltage. In some embodiments, the pre-determined voltage corresponds to and/or is associated with an electric current of 2.0 Amperes at most or 5.0 Amperes at most or 10.0 Amperes at most. The comparator compares the voltage drop over the resistive element to the pre-determined voltage and produces an output signal indicative of an excessive current. The signal produced by the comparator is forwarded to at least one switch arranged in series with at least one of the wires for (direct) connection to the CAT-5 or CAT-6 cable. The at least one switch throws (opens) in response to the output signal indicative of an excessive current thereby interrupting the Power-over-Ethernet connection.

Figure 3:
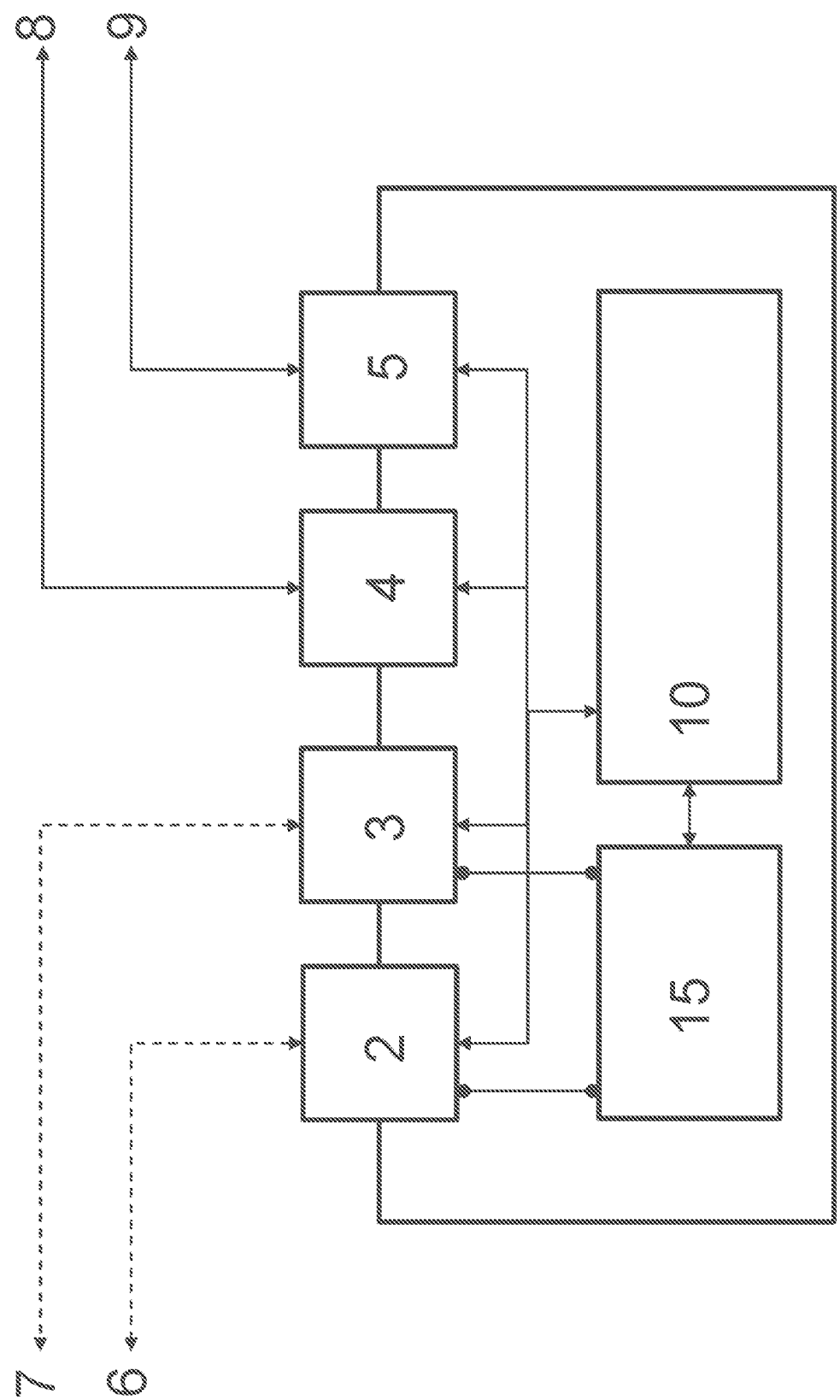
FIG. 3 provides a block diagram of a network switch with a voltage conversion unit supplying PoE ports.

Now referring to FIG. 3, a network switch 1 with a power source 15 is shown. Power source 15 may, by way of non-limiting example, be of any of the types described above. Power source 15 may comprise a programmable power source and as such connected to controller 10. The (direct) connection may support bidirectional and/or (full) duplex communication between controller 10 and power source 15. In some embodiments, the (direct) connection between controller 10 and power source 15 supports unidirectional communication from controller 10 to power source 15. The skilled person chooses a suitable bus for these (direct) connections.

FIG. 3 also shows power source 15 in (direct) connection with Power-over-Ethernet ports 2, 3. In some embodiments, at least one of the Power-over-Ethernet ports 2, 3 provides at least one twisted-pair wire for power transmission. Power source 15 may connect to the at least one twisted-pair wire for power transmission. In some embodiments, all of the Power-over-Ethernet ports 2, 3 provide at least one twisted-pair wire for power transmission. Power source 15 may connect to the at least one twisted-pair wire for power transmission of each Power-over-Ethernet port 2, 3.

In some embodiments with a programmable power source 15, controller 10 may send a disable/enable/limit signal to power source 15. Power source 15 receives and processes the disable/enable signal. Power source 15 will process the signal and will disable (cut) power supply to the Power-over-Ethernet ports 2, 3, if the signal is a disable signal. Power source 15 will process the signal and will enable (establish) power supply to the Power-over-Ethernet ports 2, 3, if the signal is an enable signal.

In some embodiments with a programmable power source 15, controller 10 may send a disable/enable signal for a particular Power-over-Ethernet port 2, 3 to power source 15. Power source 15 receives and processes the disable/enable signal. Power source 15 will process the signal and will disable (cut) power supply to the particular Power-over-Ethernet port 2, 3, if the signal is a disable signal. Power source 15 will process the signal and will enable (establish) power supply to the particular Power-over-Ethernet port 2, 3, if the signal is an enable signal.

In some embodiments, network switch 1 receives a signal with a data packet, wherein the data packet comprises a disable/enable signal. The signal is received and demodulated as described above. Controller 10 processes the disable/enable signal and sends an disable/enable signal to programmable power source 15. Programmable power source 15 receives and processes the signal from controller 10. Programmable power source 15 disables or enables power supply to the Power-over-Ethernet ports 2, 3 in response to the disable/enable signal In some embodiments, network switch 1 receives a signal with data packet, wherein the data packet comprises a disable/enable signal targeting a specific Power-over-Ethernet port 2, 3. The signal is received and demodulated as described above. Controller 10 processes the disable/enable signal and sends an disable/enable signal targeting the specific Power-over-Ethernet port 2, 3 to programmable power source 15. Programmable power source 15 receives and processes the signal from controller 10. Programmable power source 15 disables or enables power supply to the specific Power-over-Ethernet port 2, 3 in response to the disable/enable signal in response to the disable/enable signal.

In some embodiments, controller 10 receives disable/enable signals targeting any of the Power-over-Ethernet ports 2, 3 via an encrypted communication channel. In some embodiments, controller 10 receives disable/enable signals targeting any of the Power-over-Ethernet ports 2, 3 only from a limited number pre-determined addresses (sources). In some embodiments, controller 10 processes a certificate to verify the authenticity of a source sending a disable/enable signal targeting any of the Power-over-Ethernet ports 2, 3.

In some embodiments, power source 15 monitors (electric) currents supplied to Power-over-Ethernet ports 2, 3. If any of those currents exceeds a pre-determined threshold, the power source 15 will cut and/or limit and/or restrict supply to the affected (faulted) Power-over-Ethernet port 2, 3 or to all Power-over-Ethernet ports. The pre-determined threshold may, by way of non-limiting example, be 2.0 Amperes at most, 5.0 Amperes at most or 10.0 Amperes at most. Current limitation inhibits short-circuits in the Power-over-Ethernet system or network.

Parts of network switch 1, especially controller 10 and ports 2-5, or of a method according to the present disclosure may be embodied in hardware, in a software module executed by a processor, or in a cloud computer, or in a combination of these. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), magnetic RAM, read only memory (ROM), flash memory, EPROM memory, EEPROM memory, registers, a hard disk, a removable disk, other optical disks, a Millipede® device, or any available media that can be accessed by a computer or any other IT equipment and appliance.

In other words, the instant disclosure teaches a network switch (1), the network switch (1) comprising:

a plurality of Power-over-Ethernet ports (2, 3), each Power-over-Ethernet port (2, 3) configured to connect to a plurality of twisted-pair wires (6, 7) and configured to send and to receive signals with at least one data packet, the at least one data packet comprising a target address, and configured to transmit direct-current electric power via the plurality of twisted-pair wires (6, 7);

at least a first Powerline Communication port (4, 5) configured to connect to a pair of line wires (8, 9) supplying alternating-current electric power and configured to send and to receive signals with at least one data packet via the pair of line wires (8, 9);

wherein the at least one data packet comprises a target address;

the network switch (1) further comprising a controller (10) and a memory, the memory storing a lookup table with a plurality of entries, wherein each entry comprises and/or pairs a target address of a data packet and a target port selected from one of the ports of the plurality of Power-over-Ethernet ports (2, 3) or from the at least a first Powerline Communication port (4, 5);

the controller (10) being communicatively coupled to each of the ports (2-5) of the plurality of Power-over-Ethernet ports (2, 3) and to the at least a first Powerline Communication port (4, 5) and to the memory, the controller (10) being configured to:

receive an inbound signal with at least one data packet from one of ports (2-5) of the plurality of Power-over-Ethernet ports (2, 3) or from the at least a first Powerline Communication port (4, 5), demodulate the inbound signal, produce at least one data packet from the demodulated inbound signal, determine the target address of the at least one data packet, look up the determined target address in the lookup table to determine and/or identify at least one target port (2-5), produce an outbound signal modulated for the at least one target port from the at least one data packet, and send the modulated outbound signal to the at least one target port (2-5).

In some embodiments, the lookup table is a routing table (according to OSI level 2) and/or a switching table (according to OSI level 3). The memory is advantageously a non-volatile memory.

Controller (10) may store a routing table and is configured to read the routing table and to process (entries of) the routing table and/or switching table.

Controller (10) may be configured to process the demodulated inbound signal to produce at least one data packet In some embodiments, each entry of the routing table and/or switching table specifies and/or indicates a target port as a (exclusive and/or direct) function of a target address of a data packet.

In some embodiments, the controller (10) is communicatively directly coupled to each of the ports (2-5) of the plurality of Power-over-Ethernet ports (2, 3) and to the at least a first Powerline Communication port (4, 5).

In some embodiments, the network switch (1) comprises at least a first Powerline Communication port (4, 5) configured to connect to a pair of line wires (8, 9) supplying and/or carrying alternating-current electric power and configured to send and to receive signals with at least one data packet, the at least one data packet comprising a target address, via the pair of line wires (8, 9).

In some embodiments, the target port (2-5) is configured to send the modulated outbound signal via the plurality of twisted-pair wires (6, 7) if the target port is one of the ports of the plurality of Power-over-Ethernet ports (2, 3), and wherein the target port (2-5) is configured to send the modulated outbound signal via the pair of line wires (8, 9) if the target port is a Powerline Communication port (4, 5).

In some embodiments, the target port (2-5) is configured to receive the signal with at least one data packet via the plurality of twisted-pair wires (6, 7) if the target port is one of the ports of the plurality of Power-over-Ethernet ports (2, 3), and wherein the target port (2-5) is configured to receive the signal with at least one data packet via the pair of line wires (8, 9) if the target port is the at least a first Powerline Communication port (4, 5).

In some embodiments, the controller (10) comprises at least one Power-over-Ethernet modulation unit (11, 12) configured to demodulate an inbound signal for transmission via a plurality of twisted-pair wires (6, 7), and wherein the controller (10) comprises at least one Powerline Communication modulation unit (13, 14) configured to produce and/or condition an outbound signal modulated for transmission via a pair of line wires (8, 9), the controller (10) being configured to:

use the at least one Power-over-Ethernet modulation unit (11, 12) to produce and/or condition an outbound signal modulated for the target port (2, 3) from the at least one data packet, if the target port is one of the ports of the plurality of Power-over-Ethernet ports (2, 3), use the at least one Powerline Communication modulation unit (13, 14) to produce and/or condition an outbound signal modulated for the target port (4, 5) from the at least one data packet, if the target port is the at least a first Powerline Communication port (4, 5).

In some embodiments, the controller (10) comprises at least one Power-over-Ethernet demodulation unit (11, 12) configured to process a demodulated inbound signal received from one of the ports of the plurality of Power-over-Ethernet ports (2, 3) to produce at least one data packet, and wherein the controller (10) comprises at least one Powerline Communication demodulation unit (13, 14) configured to process a demodulated inbound signal received from the at least a first Powerline Communication port (4, 5) to produce at least one data packet, the controller (10) being configured to:

use the at least one Power-over-Ethernet demodulation unit (11, 12) to demodulate the inbound signal, if the inbound signal with at least one data packet is received from one of ports (2-5) of the plurality of Power-over-Ethernet ports (2, 3), use the at least one Powerline Communication demodulation unit (13, 14) to demodulate the inbound signal, if the inbound signal with at least one data packet is received from the at least a first Powerline Communication port (4, 5).

In some embodiments, the controller (10) comprises at least one Power-over-Ethernet demodulation unit (11, 12) configured to demodulate an inbound signal received from one of the ports of the plurality of Power-over-Ethernet ports (2, 3), and wherein the controller (10) comprises at least a one Powerline Communication demodulation unit (13, 14) configured to demodulate an inbound signal received from the at least a first Powerline Communication port (4, 5), the controller (10) being configured to:

use the at least one Power-over-Ethernet demodulation unit (11, 12) to produce at least one data packet from the demodulated inbound signal, if the inbound signal with at least one data packet is received from one of ports (2-5) of the plurality of Power-over-Ethernet ports (2, 3), use the at least one Powerline Communication demodulation unit (13, 14) to produce at least one data packet from the demodulated inbound signal, if the inbound signal with at least one data packet is received from the at least a first Powerline Communication port (4, 5).

In some embodiments, the plurality of Power-over-Ethernet ports (2, 3) comprises:

a first Power-over-Ethernet port (2, 3) configured to connect to a first plurality of twisted-pair wires (6, 7) and to transmit direct-current electric power via the first plurality of twisted-pair wires (6, 7), and a second Power-over-Ethernet port (2, 3) configured to connect to a second plurality of twisted-pair wires (6, 7) and to transmit direct-current electric power via the second plurality of twisted-pair wires (6, 7), an interconnecting link electrically connected to the first Power-over-Ethernet port (2, 3) and electrically connected to the second Power-over-Ethernet port (2, 3), wherein the link is configured to transmit direct-current electric power from the first Power-over-Ethernet port (2, 3) to the second Power-over-Ethernet port (2, 3).

In some embodiments, the interconnecting link comprises and/or is a bridge wire. In some embodiments, the bridge wire is connected to one of the wires of the first plurality of twisted-pair wires or to one of the wires of the second plurality of twisted-pair wires. In some embodiments, the interconnecting link comprises a thermistor.

In some embodiments, the first Power-over-Ethernet port (2, 3) comprises a first modular connector configured to connect to the first plurality of twisted-pair wires (6, 7), the first modular connector being of a first type, wherein the second Power-over-Ethernet port (4, 5) comprises a second modular connector configured to connect to the second plurality of twisted-pair wires (8, 9), the second modular connector being of a second type, wherein the first type of modular connector is different from the second type of modular connector.

In some embodiments, there is at least a second Powerline Communication port (4, 5) configured to connect to a second pair of line wires (8, 9) supplying alternating-current electric power and configured to send and to receive signals with at least one data packet, the at least one data packet comprising a target address, via the second pair of line wires (8, 9), the controller (10) being communicatively (directly) coupled to the at least a second Powerline Communication port (4, 5), the at least a first Powerline Communication port (4, 5) comprising a first plug of a first type, the at least a first Powerline Communication port (4, 5) comprising a second plug of a second type, wherein the first type of plug is different from the second type of plug.

In some embodiments, the plurality of Power-over-Ethernet ports (2, 3), comprises at least one Power-over-Ethernet port (2, 3) that is compatible with at least one standard selected from and/or with at least two standards selected from:

IEEE 802.3at:2009,
IEEE 802.3af:2003,
IEEE 802.3au:2006.

In some embodiments, there is a programmable power source (15) configured to supply electric direct-current power, the programmable power source (15) being electrically connected to at least one of the ports of the plurality of Power-over-Ethernet ports (2, 3), the programmable power source (15) being communicatively (directly) coupled to the controller (10), the controller (10) being configured to:
produce an enable signal,
send the enable signal to the power source (15),
the power source (15) being configured to:
receive the enable signal from the controller (10),
upon receipt of the enable signal, enable supply of direct-current electric power to the at least one Power-over-Ethernet port (2, 3) connected to the power source (15).

In some embodiments, there is a programmable power source (15) configured to supply electric direct-current power, the programmable power source (15) being electrically connected to at least one of the ports of the plurality of Power-over-Ethernet ports (2, 3), the programmable power source (15) being communicatively (directly) coupled to the controller (10), the controller (10) being configured to:
produce a disable signal,
send the disable signal to the power source (15),
the power source (15) being configured to:
receive the disable signal from the controller (10),
upon receipt of the disable signal, disable supply of direct-current electric power to the at least one Power-over-Ethernet port (2, 3) connected to the power source (15).

In some embodiments, at least one of the ports of the plurality of Power-over-Ethernet ports (2, 3) comprises an electric connector to a twisted-pair wire with a pair of leads, wherein the electric connector to the twisted-pair wire provides comprises a thermistor, wherein the thermistor is arranged to connect in series with one of the leads of the twisted-pair wire.

It should be understood that the foregoing relates only to certain embodiments of the disclosure and that numerous changes may be made therein without departing from the scope of the disclosure as defined by the following claims. It should also be understood that the disclosure is not restricted to the illustrated embodiments and that various modifications can be made within the scope of the following claims.

REFERENCE NUMERALS 1 network switch
2-3 ports for connection to a Power-over-Ethernet system and/or network
4-5 ports for connection to a system and/or to a network incorporating Powerline Communication
6-7 lines connecting to a Power-over-Ethernet system and/or network
8-9 lines connecting to a system and/or to a network incorporating Powerline Communication 10 processor, in particular microcomputer and/or microprocessor
11-14 modulator/demodulator units
15 (programmable) power source

The invention claimed is:
1. A network switch comprising:
a plurality of Power-over-Ethernet ports connected to a plurality of twisted-pair wires and configured to send and to receive signals with a data packet comprising a target address, and configured to transmit direct-current electric power via the plurality of twisted-pair wires;
a first Powerline Communication port connected to a pair of line wires supplying alternating-current electric power and configured to send and to receive signals with a data packet via the pair of line wires;
a controller; and
a memory storing a lookup table with a plurality of entries, wherein each entry comprises a target address correlating to a specific target address and a target port selected from one of the ports of the plurality of Power-over-Ethernet ports or from the first Powerline Communication port;
the controller communicatively coupled to each of the ports of the plurality of Power-over-Ethernet ports and to the first Powerline Communication port and to the memory;
the controller configured to:
receive an inbound signal with a data packet from one of ports of the plurality of Power-over-Ethernet ports or from the Powerline Communication port;
demodulate the inbound signal,
produce the data packet from the demodulated inbound signal;
determine the target address of the data packet;
look up the determined target address in the lookup table to identify a target port;
produce an outbound signal modulated for the target port from the data packet; and
send the modulated outbound signal to the target port.
2. The network switch according to claim 1, wherein:
the target port is configured to send the modulated outbound signal via the plurality of twisted-pair wires if the target port is one of the ports of the plurality of Power-over-Ethernet ports; and
the target port is configured to send the modulated outbound signal via the pair of line wires if the target port is the Powerline Communication port.
3. The network switch according to claim 1, wherein:
the target port is configured to receive the signal with the data packet via the plurality of twisted-pair wires if the target port is one of the ports of the plurality of Power-over-Ethernet ports; and
the target port is configured to receive the signal with the data packet via the pair of line wires if the target port is the Powerline Communication port.
4. The network switch according to claim 1, wherein the controller comprises:
a Power-over-Ethernet modulation unit configured to demodulate an inbound signal for transmission via a plurality of twisted-pair wires; and
a Powerline Communication modulation unit configured to produce an outbound signal modulated for transmission via a pair of line wires;
wherein the controller is configured to:
use the at least one Power-over-Ethernet modulation unit to produce an outbound signal modulated for the target port from the data packet if the target port is one of the ports of the plurality of Power-over-Ethernet ports; and
use the at least one Powerline Communication modulation unit to produce an outbound signal modulated for the target port from the data packet if the target port is the first Powerline Communication port.
5. The network switch according to claim 1, wherein:
the controller comprises a Power-over-Ethernet demodulation unit configured to process a demodulated inbound signal received from one of the ports of the plurality of Power-over-Ethernet ports to produce the data packet; and
the controller comprises a Powerline Communication demodulation unit configured to process a demodulated inbound signal received from the first Powerline Communication port to produce the data packet;
the controller configured to:
use the Power-over-Ethernet demodulation unit to demodulate the inbound signal, if the inbound signal with the data packet is received from one of ports of the plurality of Power-over-Ethernet ports; and
use the Powerline Communication demodulation unit to demodulate the inbound signal, if the inbound signal with the data packet is received from the at least a first Powerline Communication port.
6. The network switch according to claim 1, wherein the controller comprises:
a Power-over-Ethernet demodulation unit configured to demodulate an inbound signal received from one of the ports of the plurality of Power-over-Ethernet ports; and
a Powerline Communication demodulation unit configured to demodulate an inbound signal received from the first Powerline Communication port;
the controller configured to:
use the at least one Power-over-Ethernet demodulation unit to produce the data packet from the demodulated inbound signal if the inbound signal with the data packet is received from one of ports of the plurality of Power-over-Ethernet ports; and
use the Powerline Communication demodulation unit to produce at least one data packet from the demodulated inbound signal if the inbound signal with the data packet is received from the first Powerline Communication port.
7. The network switch according to claim 1, wherein the plurality of Power-over-Ethernet ports comprises:
a first Power-over-Ethernet port configured to connect to a first plurality of twisted-pair wires and to transmit direct-current electric power via the first plurality of twisted-pair wires;
a second Power-over-Ethernet port configured to connect to a second plurality of twisted-pair wires and to transmit direct-current electric power via the second plurality of twisted-pair wires; and
an interconnecting link electrically connected to the first Power-over-Ethernet port and electrically connected to the second Power-over-Ethernet port;
wherein the link is configured to transmit direct-current electric power from the first Power-over-Ethernet port to the second Power-over-Ethernet port.
8. The network switch according to claim 7, wherein the interconnecting link comprises a bridge wire.
9. The network switch according to claim 7, wherein the interconnecting link comprises a thermistor.

10. The network switch according to claim 7, wherein:
the first Power-over-Ethernet port comprises a first modular connector configured to connect to the first plurality of twisted-pair wires, the first modular connector being of a first type;
the second Power-over-Ethernet port comprises a second modular connector configured to connect to the second plurality of twisted-pair wires, the second modular connector being of a second type; and
the first type of modular connector is different from the second type of modular connector.

11. The network switch according to claim 1, further comprising:
a second Powerline Communication port configured to connect to a second pair of line wires supplying alternating-current electric power and configured to send and to receive signals with the data packet, the data packet comprising a target address, via the second pair of line wires;
the controller communicatively coupled to the second Powerline Communication port;
the first Powerline Communication port comprising a first plug of a first type; and
the first Powerline Communication port comprising a second plug of a second type;
wherein the first type of plug is different from the second type of plug.

12. The network switch according to claim 1, wherein the plurality of Power-over-Ethernet ports comprises at least one Power-over-Ethernet port compatible with at least one standard selected from:
IEEE 802.3at:2009, or
IEEE 802.3af:2003, or
IEEE 802.3au:2006.

13. The network switch according to claim 1, further comprising:
a programmable power source configured to supply electric direct-current power, electrically connected to at least one of the ports of the plurality of Power-over-Ethernet ports, communicatively coupled to the controller; and
the controller configured to:
produce an enable signal; and
send the enable signal to the power source;
the power source configured to:
receive the enable signal from the controller; and
upon receipt of the enable signal, enable supply of direct-current electric power to the Power-over-Ethernet port connected to the power source.

14. The network switch according to claim 1, further comprising:
a programmable power source configured to supply electric direct-current power, electrically connected to at least one of the ports of the plurality of Power-over-Ethernet ports, communicatively coupled to the controller (10); and
the controller configured to:
produce a disable signal; and
send the disable signal to the power source;
the power source configured to:
receive the disable signal from the controller;
upon receipt of the disable signal, disable supply of direct-current electric power to the Power-over-Ethernet port connected to the power source.

15. The network switch according to claim 1, wherein:
at least one of the ports of the plurality of Power-over-Ethernet ports comprises an electric connector to a twisted-pair wire with a pair of leads;
the electric connector to the twisted-pair wire provides comprises a thermistor; and
wherein the thermistor is arranged to connect in series with one of the leads of the twisted-pair wire.

* * * * *